United States Patent [19]

Dornbluth et al.

[11] 4,012,818
[45] Mar. 22, 1977

[54] BORING MILL AND MILLING DEVICE WITH A TOOL MAGAZINE

[75] Inventors: Jürgen R. K. Dornblüth; Gerd Engel, both of Rheydt; Heinrich Klassen, Viersen, all of Germany

[73] Assignee: Scharmann & Co., Rheydt, Germany

[22] Filed: Nov. 14, 1974

[21] Appl. No.: 523,811

[30] Foreign Application Priority Data

Nov. 14, 1973 Germany .......................... 2356799

[52] U.S. Cl. ................................ 29/26 A; 29/568;
90/11 A
[51] Int. Cl.² ......................................... B23Q 3/157
[58] Field of Search ............... 90/11 A, 11 B, 11 D;
29/26 A, 568; 403/353; 248/223; 83/698,
699, 700, 690

[56] References Cited
UNITED STATES PATENTS

| | | | |
|---|---|---|---|
| 2,488,903 | 11/1949 | Edwards | 248/223 X |
| 3,027,792 | 4/1962 | Hohl | 83/698 |
| 3,709,623 | 1/1973 | Stephan et al. | 29/568 X |

*Primary Examiner*—Othell M. Simpson
*Assistant Examiner*—Z. R. Bilinsky
*Attorney, Agent, or Firm*—Walter Becker

[57] ABSTRACT

A horizontal boring mill and milling device with a tool carrier adjustable as to height on a horizontally displaceable stand and with a tool magazine arranged laterally thereof, in which the tools or set of tools are held parallel to the boring or milling spindle axis. The tool magazine or frame is, for purposes of exchanging heavy tools or set of tools, arranged in front and in the region of movement of the tool carrier, and the tools or set of tools have flange-shaped extensions, or the like, for holding in the tool magazine and on the tool carrier.

13 Claims, 7 Drawing Figures

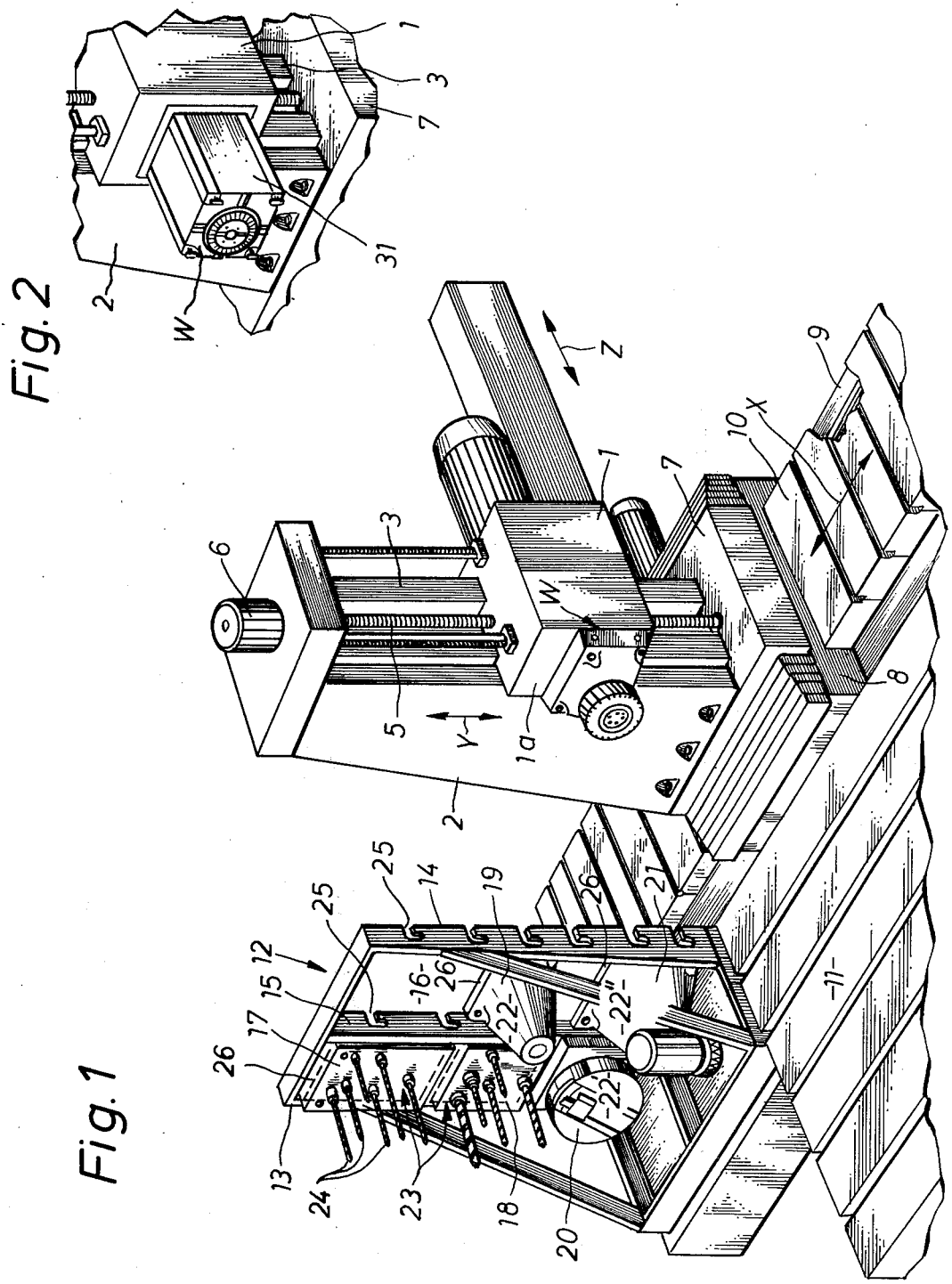

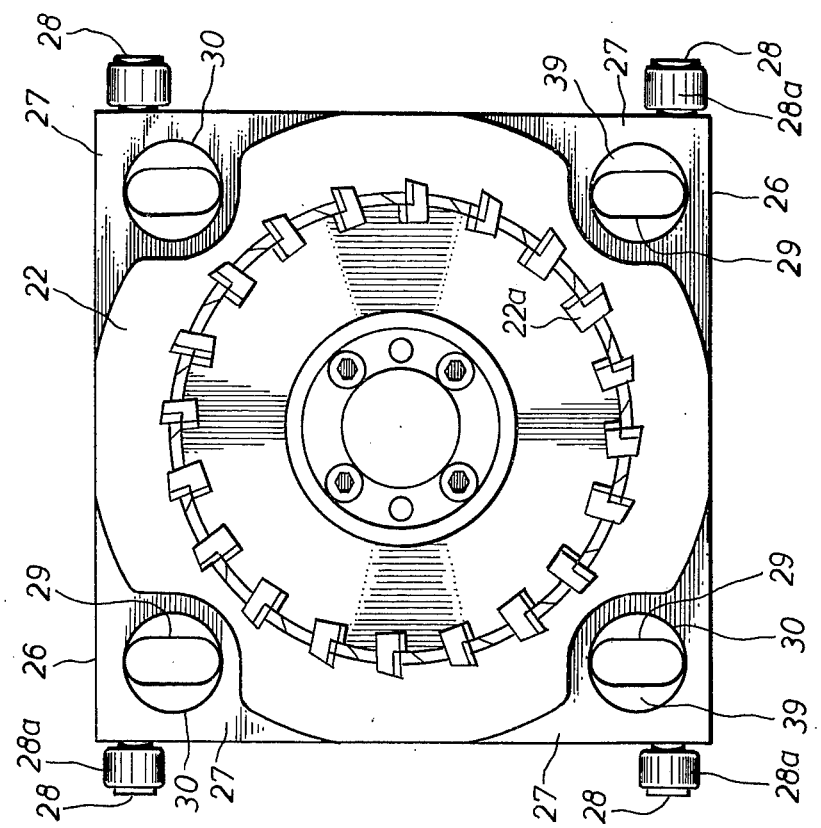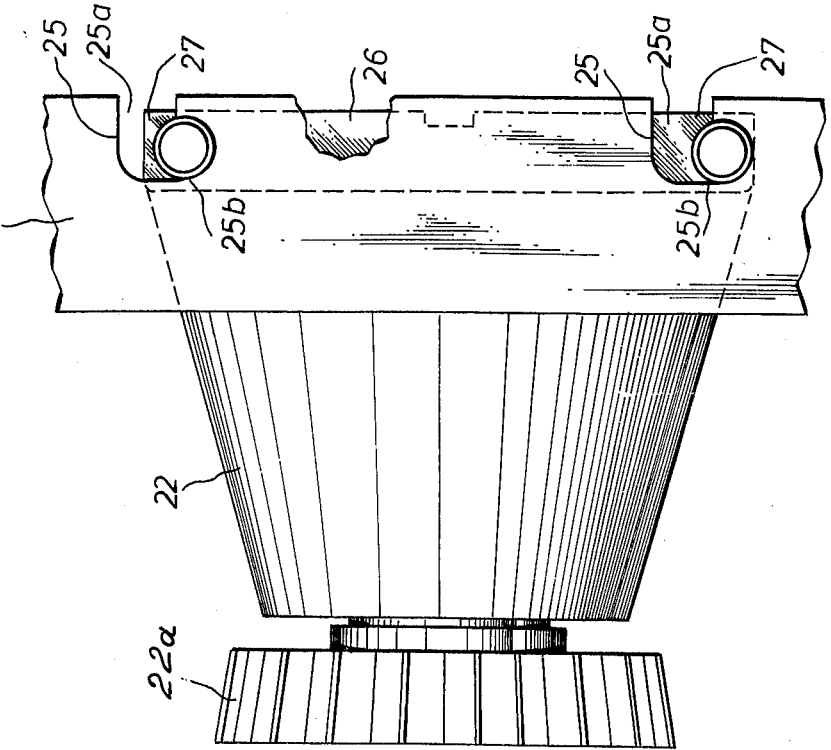

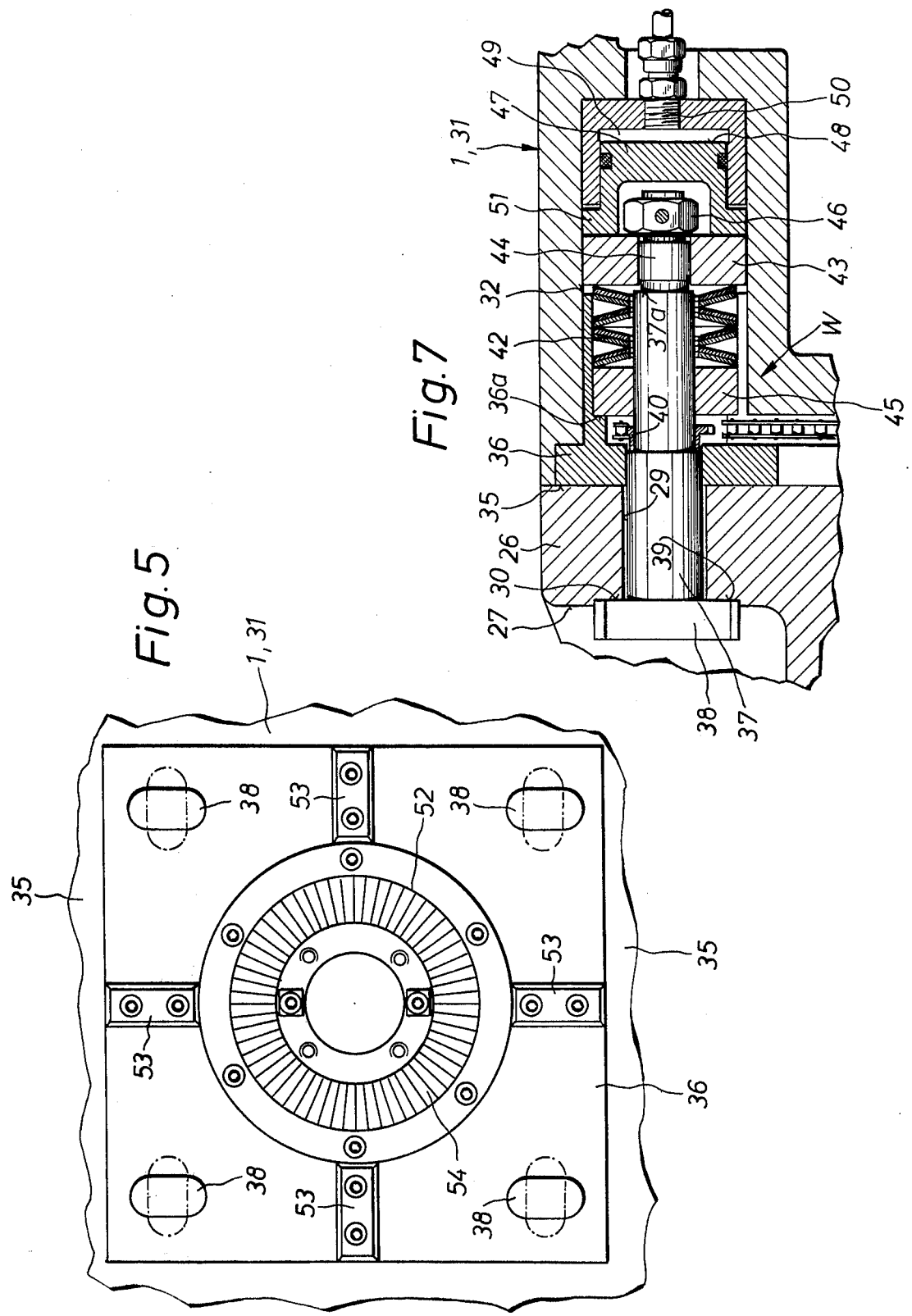

BORING MILL AND MILLING DEVICE WITH A TOOL MAGAZINE

The present invention relates to a horizontal boring mill and milling device with a tool carrier adjustable as to height on a horizontally displaceable stand and with a tool magazine arranged laterally thereof, in which the tools or set of tools are held parallel to the boring or milling spindle axis. As tools within the scope of the present invention, heavy tools are to be understood such as heavy cutter heads, angle cutter heads, multiple drilling heads and also supporting bearings, and face discs, as well as sets of tools combined to form a unit.

Tools of the above mentioned type are generally too heavy in order to be handled and mounted on the tool carrier or to be removed therefrom so that the exchange of tools has to be carried out by means of a crane, the use of which, requires a servicing and setting time.

For the automatic tool exchange, it is known in connection with horizontal drilling mills and milling devices to provide the tools with conical or cylindrical receiving shanks and to move such tools by means of transferring devices from a magazine into the tool receiving part of the tool carrier. In this connection, laterally adjacent the tool carrier there are provided chains, gears, or discs, which serve as tool magazines and from which the tools, for instance, by means of pivotable two-arm levers are introduced into the boring spindles as tool carrier. Similarly, used tools can by said tool magazines be removed from the boring spindle and moved to the magazine. For identifying the tools, tool coding or place coding on the magazine may be employed.

These heretofore known horizontal boring mills and milling devices with laterally arranged magazines and transferring devices for the tools are not only very expensive, but are not suitable for heavy tools of the type mentioned above.

It is, therefore, an object of the present invention to provide a horizontal boring mill and milling device of the above mentioned type, in which in addition to the tool exchange devices already provided on boring mills and milling devices there may be provided heavy tools with simple means and in a time-saving manner from a magazine to a tool carrier and vice versa while facilitating or eliminating altogether manual handling.

It is a further object of this invention to provide means which will make it possible to convert horizontal boring mills and milling devices already in use to a horizontal boring mill and milling device according to the invention without great expenses.

These and other objects and advantages of the invention will appear more clearly from the following specification, in connection with the accompanying drawings, in which:

FIG. 1 is a platform boring mill which is displaceable crosswise, and is equipped with a tool magazine, one of the tools being withdrawn and connected to the tool carrier.

FIG. 2 illustrates a portion of a supporting beam drilling mill and milling device while the tool-free supporting beam is moved out of the headstock to a receiving position at the magazine.

FIG. 3 represents a side view of a tool in the magazine.

FIG. 4 is a front view of a tool with its flanges and holding pins.

FIG. 5 shows the front view of a tool carrier, i.e. of that section of the headstock or the carrier beam which receives and carries the tool or the tool set.

FIG. 7 is a longitudinal section through one of the holding pins and also shows the connection of a holding pin in the tool carrier.

Figure 6:
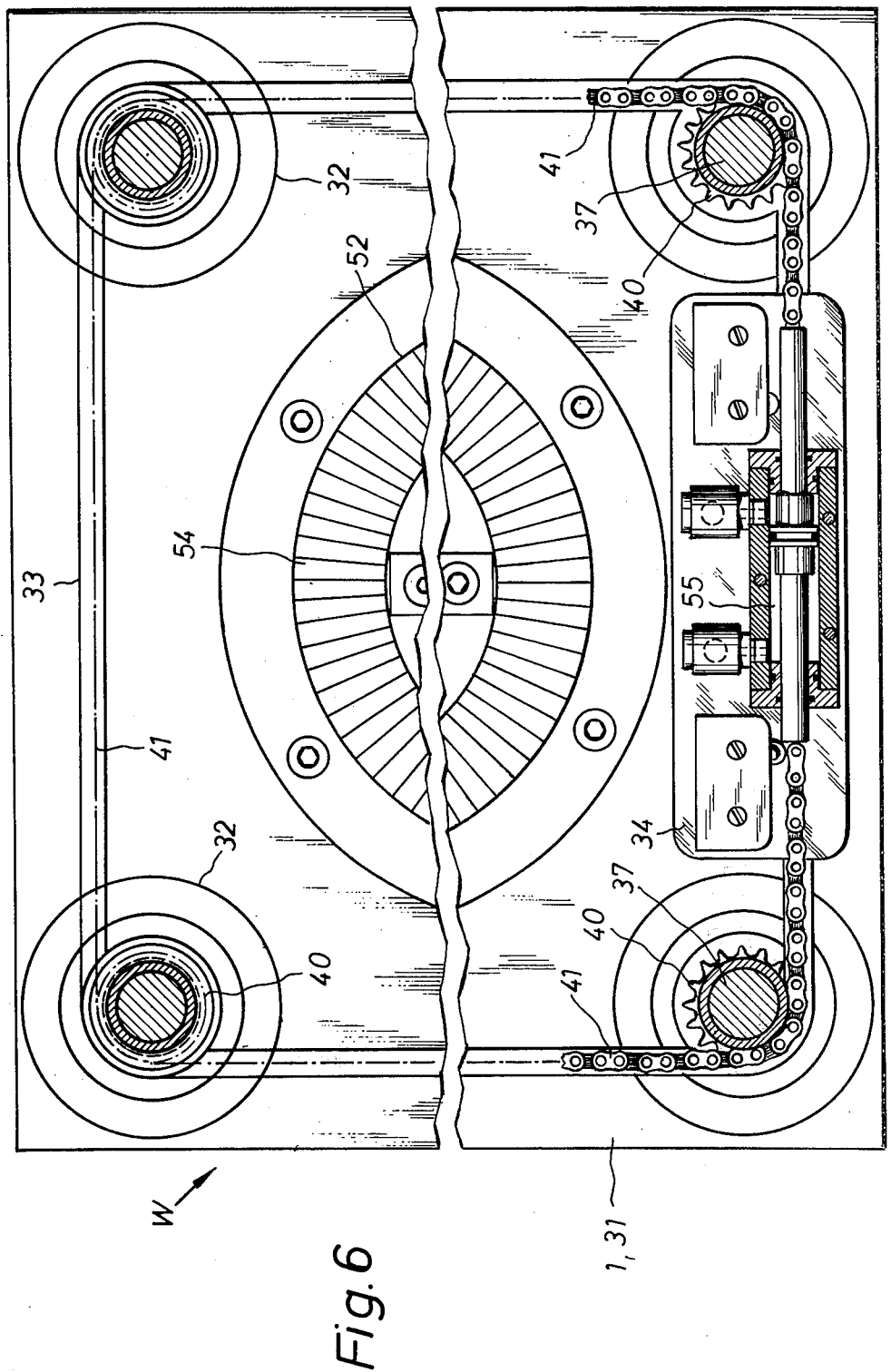
FIG. 6 is a front view of the tool carrier with the cover plate removed.

For purposes of realizing the objects of the present invention as outlined above, the invention provides a horizontal boring mill and milling device of the described type in which for purposes of exchanging heavy tools or tool sets, the tool magazine is arranged laterally in front of and in the range of movement of the tool carrier, and the tools or tool sets have extensions for holding in the tool magazine and on the tool carrier.

The present invention is based on the idea of using three-dimensional displacement possibilities of the tool carrier for moving the tool carrier to the tool magazine in such a way that the heavy tools or tool sets can be coupled in or on the magazine to the tool carrier. The tool carrier takes over the job of a transferring device necessary with heretofore known designs by means of which transferring device the tools are withdrawn from the magazine and conveyed to the tool carrier, for instance, the boring spindle. As tool carrier, the front especially designed end face of the headstock or a carrier beam of the boring mill or milling device is to be understood. Also, the tool carrier may be formed by a plate-shaped intermediate body which is to be connected to the end face of the headstock or the carrier beam. The said intermediate body may be held on these parts by screw bolts.

Aside from the saving of the above mentioned transferring device, the magazine does not require any additional device in order to be able to adjust the tools within the magazine as is the case, for instance, with circular or chain-like magazines, in order to move the respective desired tool to the transfer station where the tool is grasped by the transferring device.

Therefore, the tool magazine can in a simple manner be designed as a vertical stationary frame with recesses for the tools or tool sets, while said recesses are arranged one above the other or one alongside the other. The said recesses of the frame-shaped magazine are of the same type and may be round or may have four corners. For purposes of holding the tools or tool sets in the frame-shaped tool magazine, the lateral walls defining the recesses are preferably provided with bayonet slots. While the tools or tool sets have their flange-shaped extensions provided with lateral pins adapted to be inserted into the bayonet slots of the side walls of the magazine for purposes of connecting the tools or tool sets to the tool carrier, the flange-shaped extensions of the tools or tool sets are provided with bores, through which extend holding pins of the tool carrier. Each tool or each tool set which rests in the magazine may in this position by means of holding pins be connected to the tool carrier. Preferably, the tool carrier is provided with a device which is adapted to adjust together on holding pins. This device consists preferably of a longitudinally adjustable chain which is looped around on pins and is longitudinally adjustable by means of a cylinder piston unit. When actuating said cylinder piston unit all holding pins are simultaneously released or locked so that the tool or the tool set can quickly be removed from the tool carrier or be connected thereto.

According to a further development of the invention, the holding pins are continuously under the load of a spring, the pull or pressing force of which is adapted to be made ineffective by a cylinder piston unit acting upon said pins. The spring effect will be made ineffective when the pins are to be locked or unlocked as is generally the case prior to the actuation of the common chain.

Referring now to the drawings in detail, the arrangement shown in FIG. 1 comprises a headstock 1 which is movable on the stand 2 in vertical direction as indicated by the double arrow Y by means of the guiding column 3 and by means of the spindle 5 and a motor 6. The stand 2 in its turn is with its foot portion 7 adjustable on the carriage 8 in the direction of the double arrow Z, whereas the carrier 8 is displaceable on the bed 9 in the direction of the double arrow X. Above the bed 9 there is provided a cover 10.

In the machining direction in front of the headstock 1, the non-illustrated workpiece rests on the chucking plate 11. Instead of the chucking plate, a rotatable table may carry the workpiece.

Laterally in front of the headstock 1, a stationary vertical frame 12 is provided which primarily comprises the side walls 13, 14 of a central wall 15 and furthermore comprises an upper and lower transverse wall. The side walls 13, 14 and the central wall 15 define recesses 16, 17, 18, 19, 20 and 21 into which the individual tools or tool sets are insertable as shown in FIG. 1. In the embodiment illustrated in FIG. 1, tools comprising a supporting bearing, a face disc and an angle cutter are inserted respectively numbered 22, 22', and 22''. The tool sets 23 are inserted into the recesses 17, 18, said tool sets comprising a plurality of parallel drills 24 with a common drive so that all tools when actuated work together.

The side walls 13, 14 as well as the central wall 15 have bayonet-joint-like openings 25 with a horizontal section 25a and a vertical section 25b (FIGS. 1 and 3). These openings 25 are arranged above each other and in rearward direction which means in the direction toward the machine bed 9. As will be evident from FIG. 1, each recess 17–21 has associated therewith four of such bayonet-joint-like slots and more specifically arranged in pairs in both oppositely located side walls 13, 15 and 14, 15 respectively.

Tools 22, 22', 22'' or tool sets 23 are provided with flange-shaped extensions 26 (FIGS. 4 and 7) which at the four corners project beyond tools 22, 22', 22'' and form a rearward portion of the tool set 23 whereby a plane side surface 27 is formed. These flange-shaped extensions 26 are provided with lateral pivots 28 with rollers 28a the diameters of which correspond to the width of the bayonet-joint-like slot in such a way that the rollers 28a can first be introduced into the horizontal section 25a of the slot 25 and can then be lowered into the vertical section 25b of the respective slot 25. In this way, tools 22, 22', 22'' and tool sets 23 will be firmly mounted in the frame 12. However, after removing of the rollers from the vertical sections 25b, and a horizontal movement out of the horizontal sections 25a of said slots 25, the tool sets 23 can be easily removed from the frame 12.

Each flange-shaped extension 26 of said tools or of the tool set 23 has a vertical longitudinal slot 29 which merges with a circular recess 30 of a relatively shallow depth (FIGS. 4 and 7). The rear side of each tool or tool set carries non-illustrated grooves of a cross section increasing toward the outside, said grooves being arranged crosswise. Furthermore, the rear side of each tool or tool set has a rotatable part with annular teeth which part is connected to the machining element, for instance the cutter 22a in FIG. 4. The end face of the headstock 1 or the supporting beam 31 according to FIG. 2 forms the tool carrier W which has recesses 32 spaced by the distance of the slots 29 in the flange-shaped extensions 26 of said tools or of the tool sets 23.

These recesses 32 of a square or rectangular shape are respectively interconnected by a groove 33 while the groove of the lower two recesses 32 has a widened portion 34.

The recesses 32 as well as the grooves 35 are closed by a cover plate 36 which is flush with the end face 35 of the headstock 1 or of the supporting beam 31. From said cover plate 36 horizontally project four pivots 37 at the level of the flange-shaped extensions 26. The head 38 of said pivots 37 corresponds to the size of the slots 29 taking into consideration the necessary play. The heads 28 can thus be passed through the slots 29 and after being turned by 90° engage the bottom 39 of the recesses 30 whereby the pivot heads hold the flange-shaped extensions 26 and thus tools 22, 22', 22'' and tool sets 23 on the tool carrier W on the headstock or supporting beam. To this end the pivots 37 are provided with a nonrotatable pinion 40 while the chain 41 in the grooves 33 is looped around all four pivots 37 at the corners of the tool carrier W. The pivots 37 furthermore carry a supporting ring 45 which rests against a shoulder 36a of the cover plate 36. The ring 45 forms a counterbearing for a spring packet 42 the second spring counterbearing of which is formed by a second ring 43. Ring 43 is on a reduced section 44 of pivot 37 slightly displaceable between a shoulder 37a of the pivot 37 and a nut 46 which is nonrotatably arranged on the pivot.

The ring 43 is engaged by a pot-shaped part 47 the end face 48 of which forms a piston surface in a space 49 which is adapted to be subjected to a pressure medium conveyed through conduit 50. Flange 51 of the pot-shaped part 47 will, in response to the end face 48 being subjected to pressure, press the ring 43 toward the left with regard to FIG. 7 in such a way against the spring that the latter is compressed slightly and that between the ring 43 and the nut 46 there will be formed a slight chamber which permits a free rotation of the head 38 of pivot 37 on the bottom 39 of the recess 30 and thus permits a rotation of the pivot 37 by the chain 41. When the part 47 is acted upon, thus the effect of the spring 42 upon pivot 37 is made ineffective by ring 43 so that the pivot 37 is rotatable by the chain 41. For chucking the pivot 37, it is merely necessary to relieve the pressure from chamber 49 so that the spring dish packet 42 can become effective.

FIG. 5 shows the two positions of the head 32 of pivot 37 in full lines and dash lines respectively. Furthermore, FIG. 5 illustrates the centering strips 53 which engage the above described, outwardly increasing crosswise grooves at the rear side of the flange-shaped extensions 26. Furthermore, FIG. 5 shows the annular gear ring 54 which extends into corresponding teeth at the rear side of tools 22, 22', 22'' or tool set 23.

The chain 41 in groove 33 is by means of a cylinder piston unit 55 arranged in the widened portion 34 adjusted in one or the other direction in such a way that the head 38 of each pivot 37 will occupy the position shown in FIG. 5 in full lines or the position shown in dot-dash lines.

If it is intended to work with the boring spindle of the headstock 1 and a supporting bearing, the boring spindle may be moved out of the headstock in a manner known per se and the conical shaft of a tool may be inserted into the spindle while the latter rests upon the support of the supporting bearing.

The tool carrier W provided on the end face of the headstock 1, or of the supporting beam 31 may also be in the form of a separate plate-shaped intermediate member which is adapted to be linked to the headstock and which has the recesses 32 and 34. This plate-shaped intermediate member may likewise be covered by a cover 36 and by means of screws may be mounted on the headstock or the supporting arm of a horizontal boring mill or milling device already in operation.

The operation of the boring mill and milling device according to the invention is effected in the following manner while one or more of the described working sections may work simultaneously: the stand 2 is on the carriage 8 moved in the direction of the double arrow Z to its rear position so that also that tool or tool set which projects farthest in this direction can be laterally passed by the frame 12. Subsequently, the stand is moved on the machine bed 9 up to the level of a free recess 16–21, whereupon the headstock is in the direction of the vertical double arrow Y adjusted to such an extent that the lateral pivots 28 with their rollers 28a move up to the level of the horizontal sections 25a of the bayonet-joint-like slots 25. Thereupon the stand 2 with the headstock 1 is displaced horizontally while the pivots 28 with the rollers 28a are moved in the slot section 25 until the vertical section 25b has been reached whereupon the employed tool or tool set is lowered and held on the walls 13, 14, 15. After actuation of the chain 41 and the loosening of all pivots 37, the headstock 1 is returned and coordinate-wise is moved to the level of a new tool or tool set whereupon the same is connected to the tool carrier W of the headstock or of the supporting arm. This is effected by the pivots 37 being together pivoted by the chain 41 after the heads 38 have been passed through the longitudinal slots 29 of the flange-shaped extensions 26. For purposes of pivoting the heads 38 of pivots 37, each pivot 37 is prior to the actuation of chain 41 relieved from the pressure of spring 42 by actuation of the pot-shaped part 47.

It is, of course, to be understood that the present invention is, by no means, limited to the specific showing in the drawings but also comprises any modifications within the scope of the appended claims.

We claim:

1. A horizontal boring mill and milling device, which includes in combination: a horizontally displaceable stand, a tool carrier supported by and vertically movable on said stand for exchangeably receiving and supporting a tool for performing machining operations, a tool magazine comprising means for holding tools and tool sets in a position substantially parallel to their intended position in said tool carrier, and means for moving said stand relative to said magazine, said tool magazine being arranged laterally of and in a plane in front of said tool carrier and within the region of movement of said tool carrier, said tools and tool sets having supporting flange means for connecting to said tool carrier, said tool carrier being provided with means for picking up and receiving tools and tool sets from said magazine, clamping means on said tool carrier for positioning and clamping said flange means on said tool carrier, said flange means and said magazine having interengageable complementary formations including projections on one and substantially vertically extending slots in the other, said projections entering said slots when said flange means is positioned on said magazine, said tool carrier lowering said flange means with said projections in said slots so that said projections engage in said slots to retain said flange means on said magazine.

2. A machine tool according to claim 1, in which said tool magazine comprises a vertical stationary frame having recess means for receiving and holding tools and tool sets.

3. A machine tool according to claim 2, in which said recess means are arranged one upon the other.

4. A machine tool according to claim 2, in which said recess means are arranged adjacent to each other.

5. A machine tool according to claim 2, in which said recess means are of the same shape.

6. A machine tool according to claim 2, in which said magazine is provided with spaced vertical walls extending in planes substantially in a direction parallel to the desired axial extension to be taken up by the tools on said tool carrier, said walls having said recess means therein in the form of slots of bayonet joints.

7. A machine tool in combination according to claim 1, in which said clamping means comprises means including holding pins for engaging parts of a tool to be connected to said tool carrier.

8. A machine tool in combination according to claim 7, in which said clamping means of said tool carrier comprises control means for simultaneously adjusting all of the holding pins of said tool carrier for selectively connecting a tool to or disconnecting the same from said tool carrier.

9. A horizontal boring mill and milling device, which includes: a horizontally displaceable stand, a tool carrier supported by and vertically movable on said stand for exchangeably receiving and supporting a tool, a tool magazine comprising means for holding tools and tool sets in a position substantially parallel to their intended position in said tool carrier, means for moving said stand relative to said magazine, said tool magazine being arranged laterally of and in a plane in front of said tool carrier and within the region of movement of said tool carrier, and said tool means being provided with means for picking up and receiving tools and tool sets from said magazine and firmly holding the picked-up tool and tool set, said tool carrier comprising means including holding pins for engaging parts of a tool to be connected to said tool carrier, said means of said tool carrier comprising control means for simultaneously adjusting all of the holding pins of said tool carrier for selectively connecting a tool to or disconnecting the same from said tool carrier, said control means including a longitudinally adjustable chain passing over and in rotary engagement with all of said holding pins, and fluid operable cylinder piston means associated with said chain for actuating same.

10. A machine tool according to claim 9, in which said holding pins are axially adjustable, and which includes spring means yieldably holding said holding pins in a fixed position, and power operable means to make said spring means ineffective to allow adjustment of said pins by said chain.

11. A machine tool according to claim 10, in which said power operable means and said cylinder piston means simultaneously control all of said pins.

12. A machine tool in combination according to claim 1, in which said clamping means includes pins operable selectively to receive and lock tool means to and release same from said tool carrier.

13. A device according to claim 1, in which said flange means includes centering means for cooperation with corresponding centering means in a tool carrier of a boring mill and milling device.

* * * * *